July 7, 1942.  R. C. DICKINSON  2,289,182
HIGH-SPEED DIRECT-CURRENT CIRCUIT BREAKER
Filed Sept. 9, 1939
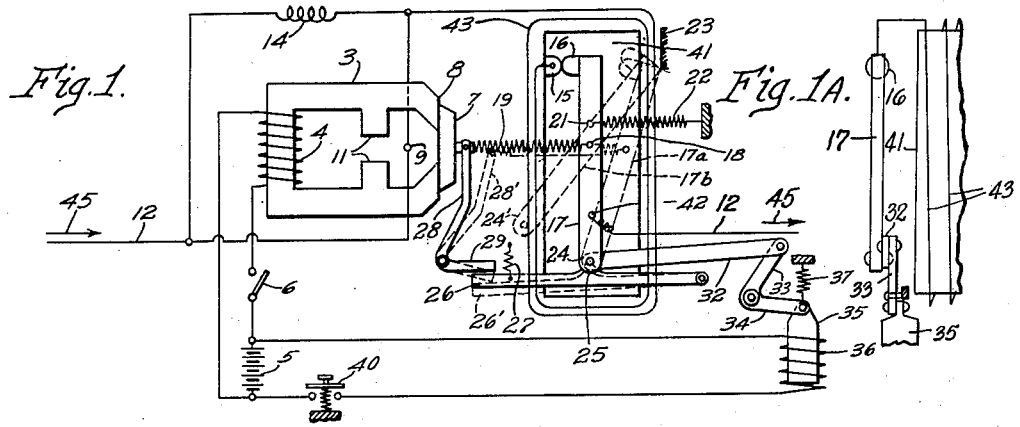
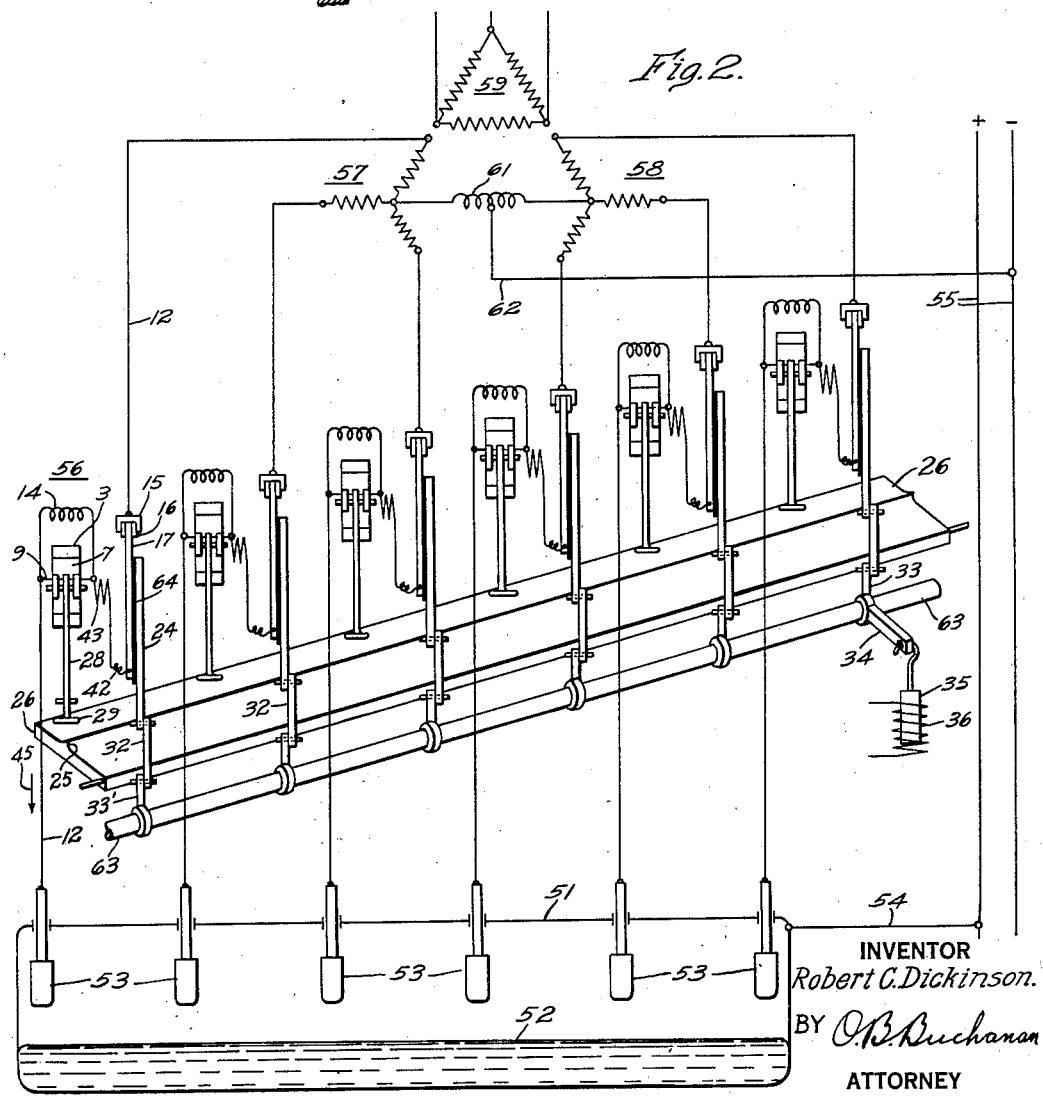
INVENTOR
Robert C. Dickinson.
BY O. B. Buchanan
ATTORNEY

UNITED STATES PATENT OFFICE 2,289,182

HIGH-SPEED DIRECT-CURRENT CIRCUIT BREAKER

Robert C. Dickinson, Wilkinsburg, Pa., assignor to Westinghouse Electric & Manufacturing Company, East Pittsburgh, Pa., a corporation of Pennsylvania Application September 9, 1939, Serial No. 294,070

2 Claims. (Cl. 200—106)

My invention relates to high-speed direct-current circuit breakers, and it has particular relation to such breakers which are designed for the protection of mercury-arc rectifiers, which require protection against two types of faults, namely, overloads in the normal direction of current-flow and arc-backs or backfires resulting in a reverse-current flow in the affected anode. One form of my invention particularly relates to a multipolar electrical switch which is designed to be connected in the anode circuits of a multiple-anode mercury-arc rectifier, and adapted to protect the rectifier against both of the above-mentioned types of faults.

The principal objects of my invention are to provide improved means for protecting the rectifier against each of the above-mentioned types of faults, and also a single means for protecting the rectifier against both types of faults.

With the foregoing and other objects in view, my invention consists in the structures, parts, combinations, systems and methods hereinafter described and claimed and illustrated in the accompanying drawing, wherein:

Figure 1 is a somewhat diagrammatic structural view illustrating a single-pole breaker embodying my invention, and showing typical electrical circuit connections, Fig. 1A is a partial end-view of the same, and Fig. 2 is a diagrammatic view of electric circuits and connections, and of structure, illustrating an embodiment of my invention adapted for the protection of a six-anode mercury-arc rectifier.

In Figure 1, the numeral 3 indicates the holding-magnet frame of a high-speed direct-current breaker, said holding-magnet being normally continuously polarized by a polarizing winding 4 which is illustrated as being energized from an auxiliary source such as a storage battery 5, through a disconnecting switch 6. In the normal closed position of the breaker, the holding magnet 3 retains a movable armature 7 in its closed position against its pole-faces 8, said movable armature 7 being releasable to its open position, to trip the breaker, by means of a conductor 9 which serves to divert a sufficient portion of the normal flux of the polarizing coil 4, from the movable armature 7 to a leakage magnetic path 11, so as to release the armature 7 and permit it to open, upon the attainment of a predetermined magnitude of current-flow in the conductor 9. The conductor 9 is serially included in a direct-current circuit 12—12 which is to be protected. In accordance with a usual practice, the conductor 9 is shunted by a reactor 14 which causes sudden increments in the current-flow in the conductor 12 to flow selectively through the conductor 9.

The main contacts of the circuit breaker comprise a relatively stationary contact 15 and a relatively movable contact 16, the latter being mounted for movement in a novel manner in accordance with my invention. The movable contact 16 is illustrated as being carried by a mechanical movement-means comprising a movable arm 17, which is connected, at an intermediate point 18, to the holding-magnet armature 7; a heavy holding-spring 19 being utilized to effect this connection for the purpose of holding the movable contact-member 16—17 closed against the stationary contact 15. The moving contact-arm 17, at another intermediate point 21 which is closer to the contact-tip 16 than the intermediate point 18, is connected to an opening biasing spring 22 which biases the movable contact toward an open position against a stop 23.

The movable contact-arm 17 is normally held in its illustrated full-line closed position by means of the holding-spring 19 which is held in a stressed position by the attraction of the magnet-armature 7, as a result of the magnetic flux in the holding-magnet 3. The holding-spring 19 is stronger than the opening-spring 22, so that the moving contact-arm 17 remains closed under these circumstances.

In accordance with my invention, also, the moving contact-arm 17 is provided with a peculiarly supported remote end 24, at its extremity remote from the moving contact 16. Ordinarily, this remote end 24 of the moving arm 16 is pivotally held in a fixed position, as illustrated by full lines, by being engaged within a notch 25 in a pivoted latch-member 26, so that the contact-arm 17 is capable of swinging about the notch 25 as a fulcrum, so that the contact-end 16 can move from its illustrated full-line closed position, when the holding-spring 19 is retained by the armature 7, to the open position of the moving arm which is indicated by the dotted lines 17a, as when the holding-magnet armature 7 is released, thereby permitting the opening-spring 22 to open the circuit breaker. The pivoted latch-member 26 may be held up in its normal latching-position, as illustrated, by a biasing-spring 27 or any equivalent biasing-means.

In further accordance with my invention, the movable armature 7 of the holding-magnet is carried by a bell-crank lever 28, which terminates in an arm 29 overlying the latch-member 26, so that, when the armature 7 is released from the holding-magnet 3, the holding-spring 19 moves the bell-crank 28 to its dotted position 28′, and the arm 29 of the bell-crank lever causes the latching member 26 to move to its dotted position 26′, thereby releasing the notch 25 from the remote end 24 of the movable contact-arm 17. The precise details of the mechanisms for effecting the tripping of the latch-member 26 by means of the bell-crank arm 29 are not essential to my invention, other than that suitable means are provided for effecting the movements which have just been described and which are illustrated by the dotted-line positions of the parts.

In further accordance with my invention, the remote end 24 of the moving contact-arm 17 is connected, by means of a link 32, to a closing mechanism or actuating means, illustrated as comprising a bell-crank 33—34 and the movable armature or core 35 of a closing coil or solenoid 36, the bell-crank arm 33 being connected to the connecting-link 32, and the bell-crank arm 34 being connected to the closing armature 35. A retrieving spring 37, or some equivalent yieldable biasing means, is also utilized as a mechanical adjustment-means to cooperate with the remote end 24 of the movable arm 17, when the latter is unlatched by the mechanism 29—26, so as to retrieve the closing armature 35 to its open position when the latching member 26 is actuated to its tripped position 26′. In this retrieving operation, the retrieving spring 37 also operates the bell-crank 33—34 and the connecting-link 32, so as to move the remote end 24 of the moving contact-arm 17 to the dotted-line position 24′, so that the moving contact-arm 17 then takes a position 17b without causing the moving contact 16 to reclose, the moving contact 16 being held open by the biasing spring 22. Here, again, the particular mechanical adjustment means for causing the remote end of the movable arm 17 to move from its full-line position 24 to its dotted-line position 24′, and for suitably guiding the remote end 24 in this movement, constitutes no especial part of my invention, other than that suitable means are provided for the purpose specified.

The effect of the retrieving movement, which causes the remote end 24 of the movable arm 17 to move to its dotted-line position 24′, is to reseat the holding-magnet armature 7 on the pole-face 8 of the holding-magnet 3, the tension on the holding-spring 19 being released by the movement of the moving arm 17 to its dotted-line position 17b. The parts are now in a position ready for reclosure by the energization of the actuating-means or closing coil 36, which may be effected by means of a push-button 40 for energizing the closing-coil 36 from the battery 5.

In further accordance with my invention, a special type of blowout magnet 41 is utilized alongside of the movable contact-carrying arm 17, so that the contact-carrying arm swings parallel to the face of the blowout magnet. As viewed in Fig. 1, the blowout magnet is back of the movable arm 17. The peculiar thing about the blowout magnet 41, in accordance with my invention, is that it is made to underlie substantially all of the extent of the movable contact-arm 17, and that the electrical current is withdrawn from said contact-arm at a point 42 which is close to the remote end 24 at a considerable distance away from the contact-making end 16. The electrical circuit 12 thus includes substantially all of the arm 17 of the movable contact 16, as well as the stationary contact 15.

The blowout magnet 41 is electrically magnetized by means of a blowout coil 43 which is also serially included in the electric circuit 12. The direction of winding the blowout coil 43 is such, as illustrated, as to cause the electro-magnetic field produced by the current flowing in the movable arm 17 to coact with the stationary electro-magnetic field emanating from the pole-face of the blowout magnet 41 in such direction as to tend to open the movable contact 16, no matter in which direction the current may be flowing in the protected circuit 12. Normally, the movable contact 16 is held closed by the holding-spring 19 with a force which is sufficiently great so that the opening force resulting from the current flowing end-to-end through the moving arm 17 is insufficient to open the breaker.

As a result of the foregoing construction, when an overload occurs, in the protected circuit 12, with unidirectional current flowing in a normal direction, such as is indicated by the arrows 45, the current in the flux-diverting conductor 9 will demagnetize the pole face 8 of the holding-magnet 3 sufficiently to release the holding spring 19 at a predetermined value of the current in the circuit 12. The moving arm 17 will immediately move to its first dotted-line position 17a, under the influence of the biasing-spring 22. At the same time, the latching member 26 will be tripped, so that the retrieving-spring 37 can move the remote end 24 of the moving arm 17 to its dotted-line position 24′, thus keeping the moving arm 17 still open, but resetting the holding-magnet armature 7 on the pole-faces of the holding-magnet 3, so that the end of the holding-spring 19 is firmly held again by the holding-magnet armature 7. In the initial opening-movement of the moving arm 17, to its open position 17a, the bias of the opening spring 22 is assisted by the electro-magnetic torque due to the cooperation of the current flowing linearly in the moving arm 17 with the magnetic field of the blowout magnet 41. After the moving arm 17 has been retrieved from its initial open-position 17a to its retrieved open-position 17b, the parts are now in condition ready for a reclosing operation, which can be effected in any desired manner by the closure of the push-button 40, which momentarily energizes the closing-coil 36 and restores the parts to the initial closed position, as indicated in full lines in Fig. 1, the movable arm 17 moving, at this time in a pivotal direction about the point 18 as a fulcrum, the point 18 being held in an approximately fixed position by the stiffness of the holding-spring 19, the other end of which is attached to the firmly-held armature 7 of the holding-magnet 3.

In the event, however, of a heavy reverse-current flow in the protected circuit 12, in a direction opposite to the arrows 45, the magnetic flux surrounding the flux-diverting conductor 9 does not divert the holding-magnet flux from the armature 7, but rather augments the same, so that the tripping is effected solely by the electro-magnetically generated force-reactions between the linearly flowing current in the movable arm 17 and the stationary field of the blowout magnet 41. When the reverse-current flow reaches a sufficiently high magnitude, this electro-magnetically produced force, aided by the bias of the opening spring 22, overcomes the stiffness of the holding-spring 19 and causes the moving arm 17 to momentarily open, pivoting on its remote end 24, so that the movable arm swings just a little way toward its previously described initial open position 17a. The opening operation is only momentary because the separation of the contacts 15 and 16 results in the interruption of the current-flow, as soon as the resulting arc can be extinguished by the blowout magnet 41, so that the movable arm 17 thereupon snaps back to its closed position again under the influence of the holding-spring 19. The inertia of the moving parts may readily be adjusted so that any suitable momentary time-delay, of a very small fraction of a second, may be provided, in the reclosure of the contacts 15 and 16, so as to allow time for the restoration of the insulating properties in the space where the arc-back or reverse-current-flow fault occurred, as will be readily understood by those skilled in the art.

In Fig. 2, I diagrammatically shown my invention as applied to the protection of a six-anode mercury-arc rectifier 51 comprising an evacuated tank having a mercury cathode 52 and six anodes 53. The cathode is connected at 54 to the positive conductor of a direct-current bus 55. The six anodes are connected, through my novel circuit breaker 56, to the two three-phase secondary windings 57 and 58 of a transformer, the primary winding 59 of which is supplied from a three-phase line. The star-points of the two secondary windings 57 and 58 are joined by a reactor 61, the midpoint of which is connected, by a conductor 62, to the negative conductor of the direct-current bus 55.

The circuit breaker 56 in Fig. 2 is a six-pole embodiment of the circuit breaker shown in Fig. 1, each of the poles of the circuit breaker being connected in one of the circuits 12—12 leading to one of the anodes 53. The several poles of the circuit breaker are represented somewhat diagrammatically, in Fig. 2, shown as if viewed in a direction at right angles to the plane on which Fig. 1 was viewed.

In Fig. 2, it is contemplated that, whenever there is a short-circuit or overload on the direct-current bus 55, all of the anode-circuits of the rectifier will be tripped out. As such a direct-current short-circuit will overload all of the anodes in the predetermined direction of current-flow 45, the means for tripping by releasing the loading-magnet armatures 7 may be left individual to each pole of the breaker 56, or a single such means may be utilized and arranged so as to trip all of the poles of the breaker 56. In the particular design illustrated in Fig. 2, I provide each of the poles with its own separate holding-magnet 3, operating as in Fig. 1, but I cause the six bell-cranks 28, which support the six holding-magnet armatures 7, to all operate on a single latching-member 26 which extends crosswise across all of the poles of the breaker, so as to be common to all six poles.

In like manner, instead of using six reclosing mechanisms, I utilize only one closing-coil 36, and I duplicate the arm 33 of the bell-crank 33—34 by keying five other arms 33' to an elongated shaft 63 of the bell-crank 33—34, said shaft 63 extending transversely across all of the poles of the breaker so as to be common to all six poles. In order to insulate the six moving contact-arms 17 from each other, I have shown, in Fig. 2, insulation 64 for separating each current-carrying movable arm 17 from the remote arm-end 24, the remote end of which engages in the notch or shoulder 25 of the latching-member 26.

The particular illustrated circuit-breaker structure which is shown in Fig. 2 is merely intended to be symbolical of various constructions which could be utilized for accomplishing the stated purposes, or other similar purposes.

The operation of the structure shown in Fig. 2 is the same as that which was described for Fig. 1 except that, as soon as any one of the six tripping bell-cranks 28 operates, as a result of the release of its holding-armature 7 from the corresponding holding-magnet 3, it trips the common latching-member 26 for all of the poles of the breaker, thus releasing the tension of all of the holding-springs 19 (Fig. 1), and permitting all of the other poles of the breaker to move instantly to the tripped position 17b (Fig. 1), under the influence of the biasing-spring 22, regardless of whether the holding-magnet armatures 7 of the other poles are released or not. For reclosing the breaker, after such a normal over-current operation, with current flowing in the normal direction 45, the single closing-coil 36 is energized, thereby rocking the common shaft 63 and actuating all six closing-arms 33, 33', thus effecting the reclosing-operation for all six poles, in the manner already described for one pole in Fig. 1.

In the event of a backfire in the rectifier 51 (Fig. 2), one of the anodes 53 will momentarily become the cathode of an arc, the other terminal of which terminates somewhere else within the tank 51, during a portion of the cycle when the particular anode should be non-conducting. This arc or backfire constitutes a severe short-circuit resulting in a very large current-flow, in the circuit of the anode, in a direction the reverse of the normal current-flow direction 45. In such an event, the movable arm 17 of the corresponding pole of the breaker 56 will momentarily open, as explained in connection with Fig 1, and this operation will take place only with respect to the anode 53 which is affected by the backfire or short-circuiting arc. Thus the backfire will be instantly cleared, without affecting the other five poles of the breaker, so that there is no interruption of service. As previously pointed out, the reclosure of the arm 17 which opens as a result of a backfire may be timed so as to occur after the very brief interval which is necessary in order to enable the space occupied by the backfiring arc to regain its proper insulating properties, so that the backfire will not, in general, repeat itself over and over again.

From the foregoing description, it will be perceived that I have provided a novel form of circuit breaker which is particularly adapted for the protection of rectifier circuits, although I am not limited, of course, to that particular application of my circuit breaker. I desire to emphasize, also, that the various structural details are not essential to the underlying principles of my invention, particularly in its broader aspects, and that the particular illustration is to be taken merely as an illustration and not by way of specific limitation. I desire, therefore, that the appended claims shall be accorded the broadest construction consistent with their language and the prior art.

I claim as my invention:

1. An electrical switch comprising a relatively stationary contact, a movable contact, a first means adapted to guide and control the movements of the movable contact toward and away from the stationary contact, a yieldable biasing-means for biasing the movable contact toward its open position, a resettable means for so changing the first means that a predetermined point in the latter may occupy either one of two different positions while said movable contact is in its open position, an electrically releasable holding-magnet means mechanically connected to said predetermined point in the first means, said holding-magnet means, when in its holding condition, being capable of holding said predetermined point in one of its positions against the bias of said yieldable biasing-means, said holding-magnet means being in its open condition when said predetermined point is in its other position, and actuating-means for so resetting the resettable means that, when the movable contact is open and said predetermined point is in its magnet-held position, said first means may be so changed as to close the movable contact while said predetermined point is still held by the electrically releasable holding-magnet means.

2. An electrical switch comprising a relatively stationary contact, a movable contact cooperating therewith, a yieldable biasing-means for biasing the movable contact toward an open position, a stronger yieldable closing-means of sufficient strength to close the movable contact against the bias of said biasing-means, releasable electromagnetic holding-means capable of exerting a force sufficient to hold said yieldable closing-means in its closing position, a resettable means for so changing the effective mechanical connection between said electro-magnetic holding-means and said yieldable closing-means that said electromagnetic holding-means may be returned to its holding position, after having been released, without causing the yieldable closing-means to close the movable contact, and means for actuating the resettable means in such manner as to cause said electromagnetic holding-means, in its holding position, to stress the yieldable closing-means sufficiently to reclose the movable contact against the bias of said yieldable biasing-means.

ROBERT C. DICKINSON.